Feb. 15, 1944. H. R. SEGAL 2,341,575
FASTENER
Filed Oct. 20, 1942 2 Sheets-Sheet 2
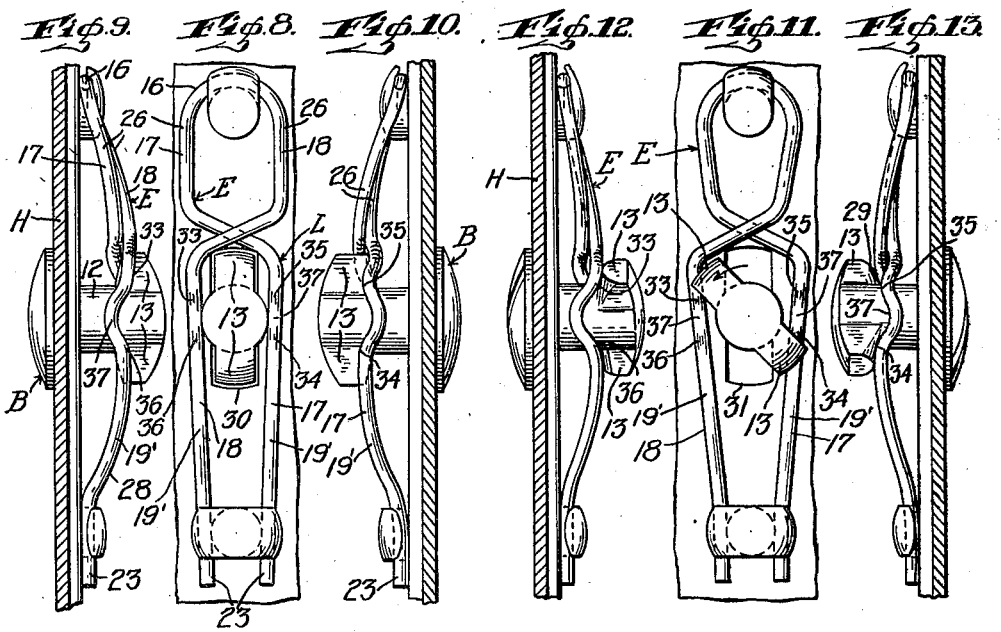
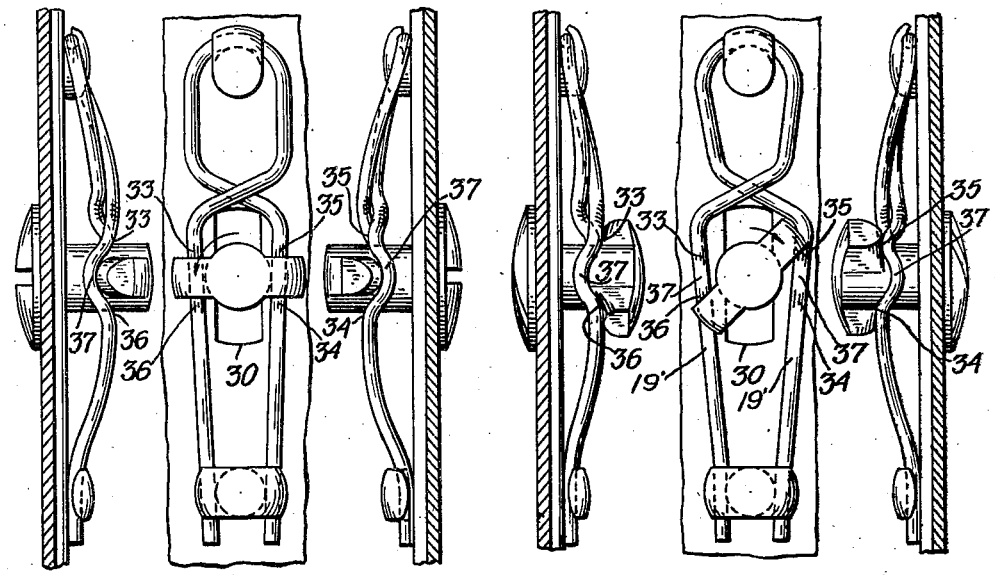
H. R. Segal
INVENTOR
BY
ATTORNEY Patented Feb. 15, 1944

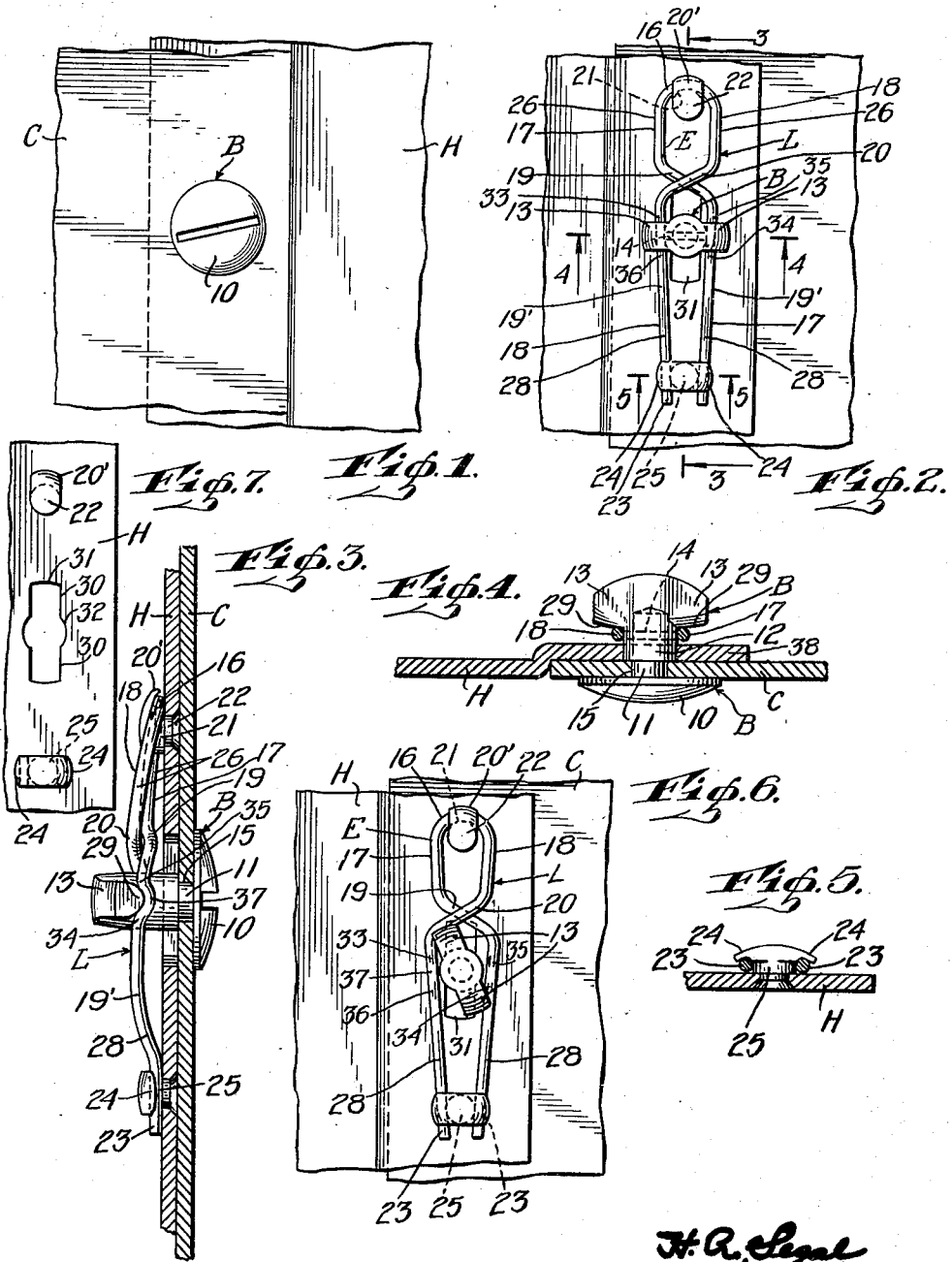

2,341,575

UNITED STATES PATENT OFFICE 2,341,575

FASTENER

Hyman R. Segal, New York, N. Y.

Application October 20, 1942, Serial No. 462,770

11 Claims. (Cl. 24—221)

This invention is a fastener utilized in connection with cowling and more particularly is concerned with an improved and novel fastener comprising rotatable locking means carried by a removable closure plate and adapted to be conveniently interlocked with cam spring means carried by a housing sealed by the closure plate. The object of the invention among others is to provide deformable spring means having laterally yieldable crossed and spaced arms adapted to initially straddle the rotatable locking means adapted to be held in a disconnectable but effective clamped relation by the spaced arms. The invention has as a further object to retain a fixed but resilient loop to the housing or housing plate wherein the resilient arms of the loop are crossed to provide adequate resiliency or elasticity to permit these arms to be flexed or stressed towards the housing plate on shifting of the rotatable locking means to its interlocked position with the crossed and flexible and resilient arms. The invention has as another object to constantly hold the rotatable locking means in its desired interlocked relation with the crossed arms held under tension by the rotatable locking means. The invention has as another important object to provide rotatable locking means having winged cams for actuating cam portions of the crossed arms of the anchored loop for initially laterally expanding an intermediate portion thereof, thereafter depressing the spaced and crossed arms carrying these cam portions and with these arms which now are under tension to prevent accidental unlocking of the rotatable locking means carried by the closure plate, hence holding the latter in its desired covered relation against the housing plate. Other important functional and structural objects, features and advantages of the invention will appear from the teachings of the following detailed description considered in connection with the accompanying drawings wherein:

Fig. 1 is a fragmentary plan view of a portion of a housing utilizing the fastener according to my invention.

Fig. 2 is an inside view of Fig. 1, however illustrating the rotatable bolt locked against the crossed arms of the anchored spring loop.

Fig. 3 is a longitudinal sectional view taken approximately on the line 3—3 of Fig. 2.

Fig. 4 is an enlarged transverse sectional view on the line 4—4 of Fig. 2.

Fig. 5 is an enlarged transverse sectional view taken on the line 5—5 of Fig. 2.

Fig. 6 is a view similar to Fig. 2 illustrating the bolt in a position about to laterally expand the spring loop.

Fig. 7 is an inside view of the housing plate however with the bolt removed.

Fig. 8 is a fragmentary but enlarged view of Fig. 2 illustrating the bolt in a neutral or unlocked position.

Fig. 9 is a left side view of Fig. 8.

Fig. 10 is a right side view of Fig. 8.

Fig. 11 is a view similar to Fig. 8 depicting the bolt shifting counter clockwise and laterally expanding the crossed arms of the spring.

Fig. 12 is a left side view of Fig. 11.

Fig. 13 is a right side view of Fig. 11.

Fig. 14 is a view similar to Fig. 8 showing the bolt in the interlocked position with the crossed arms of the loop.

Fig. 15 is a left side view of Fig. 14.

Fig. 16 is a right side view of Fig. 14.

Fig. 17 is a view similar to Fig. 11 however showing the crossed arms in an expanded relation when the bolt is shifted in a clockwise direction.

Fig. 18 is a left side view of Fig. 17, and

Fig. 19 is a right side view of Fig. 17.

The fastener according to the invention includes a locking bolt broadly designated B rotatably journalled in the closure or cover plate C and a relatively flexible and resilient wire loop generally denoted L appropriately anchored to the inner face of the housing plate H. Specifically however the rotatable bolt B embodies the circular enlarged slotted head 10 provided with a reduced shank 11 forced into a hollow bushing or skirt 12 provided with the winged or lateral projecting extensions 13. Of course this bushing is also a part of the bolt and a locking pin 14 is forced through the bushing and the reduced shank 11 to prevent separation of the latter from the bushing.

The reduced shank 11 is rotatably guided in the circular opening 15 of the closure plate C and since skirt or bushing 12 and head 10 of the bolt are larger in diameter than opening or bearing 15 and also since head 10 and bushing 12 closely but rotatably straddle this closure plate, longitudinal displacement of the bolt relative to the closure plate is precluded.

As previously stated, the loop L is a one piece relatively resilient or elastic wire member anchored to the inside face of the housing plate H. More particularly however, the loop includes the closed end or U shaped bight portion 16 having its resilient legs or arms 17 and 18 intermediately offset and crossed at 19 and 20 in a close but free or disconnected superimposed relation while the portions 19' of the legs 17 and 18 taper towards each other.

The bight portion 16 is held anchored to the closure plate under a lip 20' and against the enlarged body 21 of the rivet 22 fixed to and projecting from the closure plate C and including the lip 20'.

The terminals 23 of the converging portions or branches 19' of the crossed arms 17 and 18 of the loop are also fixedly anchored against movement by the laterally overhanging and downwardly projecting lips 24 of the rivet 25 fastened to the plate H.

By the present construction it is apparent that the extremities of the loop are firmly fixed against displacement relative to the housing plate. However the intermediate branches or portions 19' of the crossed legs 17 and 18 of the loop are normally appreciably spaced from the closure plate or support H (Figs. 9 and 10). The sides or branches 26 of the bight portion 16 progressively taper away from or are at a bias to the closure plate while the terminals 23 of the portions 19' of the legs 17 and 18 merge with the offset or oblique portions 28 sloping away from the housing plate H.

With the arrangement described, it is apparent that the bight portion 16 with its branches 26 and the crossed portions 19 and 20 form an eye member E at one end of the loop and this eye member is normally expanded as illustrated in Fig. 8. Where however the branches 19' are laterally deflected upon rotation of the actuator bolt B, portions of these branches 19' adjacent bolt B, are further diverged as shown in Figs. 11 and 17 at which time branches 26 of eye member E shift towards each other and the eye member contracts. In other words one part of the metal wire spring loop L is expanded against the normal tension of the eye member E, and hence the latter always has the inherent tendency to retract branches 19' to their normal position.

For deforming the loop to tension the latter, substantially wedge shaped members or cams 29 of the wings 13 of the actuator bolt B are utilized. These wings are projected through the contracted portions 30 (Fig. 7) of the butterfly shaped slot 31 in the housing plate H and the expanded and aligned portions 32 of this slot characterizes means for rotatably guiding the skirt or bushing 12 of the bolt which is received in the loop between the expandible branches 19' and straddled by the latter as shown in the assembled relation of the superimposed or juxtapositioned plates C and H, that is, prior to holding cover plate C against the offset seat 38 (Fig. 4) of the plate H.

With the plates in an assembled relation as shown in Fig. 8, branches 19' are neither deformed nor under tension since wings 13 are inactive. If these wings be rotated in either direction from the inactive position they selectively cooperate with the alternate cam or offset portions 33 and 34, or 35 and 36 in the spaced branches 19'. For example, where the bolt be rotated counterclockwise (Fig. 11) the cams 29 of the wings initially bear against the sides of the arms 17 and 18, thus spreading the latter laterally or outwardly whereby the cams 29 of wings 13 ride over and against offset portions 33 and 34, hence causing branches 19' of arms 17 and 18 to be deflected or depressed towards the closure plate H or in other words placed under tension. On further rotation of the bolt in the same direction the cammed wings 13 ultimately reach alined keepers or indents 37 merging with the offset portions 33 and 36 on arm 18 of the loop and with the offset portions 34 and 35 on the other arm 17 of the loop. Thus the cammed wings 13 become interlocked with the arms of the loop and clamped under tension of these arms in that on interlocking of the winged cams with the keepers, the branches 19' retract or release that is snap away from the housing plate slightly and thus bear snugly against the cams 29 since the branches 19' are still under tension. It follows that the resilient arms of the wire loop removably clamp and retain the rotatable bolt, hence holding the plates C and H close together as desired and in a clamped relation.

Of course the bolt may be rotated from its neutral position in Fig. 8 to its locked position illustrated in Fig. 14 by rotating the bolt in a clockwise direction shown in Fig. 17 in which instance the cammed wings 13 would first spread the branches 19', thereafter these wings ride over inclined portions 35 and 36 to place branches 19' under tension and ultimately wings 13 interlock with the alined indents or keepers 37 now urged towards the wings 13 because of the tension in branches 19'.

In removing the cover plate C from the housing plate H and where the bolt is locked to the expandible loop L, the bolt may be unlocked and detached from the loop by rotating the bolt in either direction by utilizing a suitable coin or manipulating tool which is applied to the slotted head 10 in which event the winged cams 29 selectively ride over alternately disposed offset portions or cams 33 and 34 or 35 and 36, to be disposed between the branches 19'. It follows that these branches are now again free of tension and have retracted to their normal position and cooperate with wings 13 to position the latter therebetween (Figs. 8-10).

Hence the bolt is lined up with the butterfly slot 31 and therafter the cover plate with its rotatable bolt may be readily detached from the housing plate. The parts herein described except for the wire loop may be of aluminum or of any suitable material. Of course in locking the bolt to the loop, the coin or tool (not shown) may also be utilized as is well understood.

Various changes may be made in the details of construction and arrangement of parts without departing from the spirit of the invention or sacrificing any of the advantages therein.

I claim:

1. A fastener for removably clamping together an inner plate having an opening and an outer plate comprising a bolt rotatably mounted on said outer plate and projectible into and through said opening and including laterally extending wings, and locking spring means secured to said inner plate comprising a loop having crossed and spaced arms for straddling said bolt and resiliently interlocking with said wings upon rotation of said bolt relative to said plates.

2. A fastener for removably clamping together an inner plate having an opening and an outer plate comprising a bolt rotatably mounted on said outer plate and projectible into and through said opening, and locking spring means secured to said inner plate comprising a loop having crossed and spaced arms for straddling said bolt and including branches resiliently interlocking therewith upon rotation of said bolt relative to said plates.

3. A fastener for removably clamping together an inner plate having an opening and an outer plate comprising a bolt rotatably mounted on said outer plate and projectible into and through said opening and including cam means, and locking spring means comprising a loop having its ends secured to said inner plate and including spaced crossed arms normally spaced from said inner plate for straddling said bolt and including means resiliently and disengageably interlocking with said cam means upon rotation of said bolt relative to said plates.

4. A fastener for removably clamping together an inner plate having an opening and an outer plate comprising a bolt rotatably mounted on said outer plate and projectible into and through said opening and including cam means, and locking spring means comprising a loop having its ends secured to said inner plate and including spaced and crossed arms having the major portion thereof normally spaced from said inner plate to define elastic branches for straddling said bolt and including an eye portion, said branches including keeper means resiliently and disengageably interlocking with said cam means upon rotation of said bolt relative to said plates for holding the latter clamped together.

5. A fastener for removably clamping together an inner plate having an opening and an outer plate comprising a bolt rotatably mounted on said outer plate and projectible into and through said opening and including cam means, locking spring means comprising a loop having its ends secured to said inner plate and including spaced arms crossed intermediately thereof and having their major portions normally spaced from said inner plate and defining resilient branches for straddling said bolt, and keeper means on said branches resiliently and disengageably interlocking with said cam means upon rotation of said bolt relative to said plates.

6. A fastener for removably clamping together an inner plate having an opening and an outer plate comprising a bolt rotatably mounted on said outer plate and projectible into and through said opening and including cam means, locking spring means comprising a loop having its ends secured to said inner plate and including spaced arms disconnectably crossed intermediately thereof and having the major portions thereof normally spaced from said inner plate to define elastic branches for straddling said bolt and an elastic normally expanded eye portion, said branches including means actuated upon by said cam means upon rotation of said bolt to spread said branches and contract said eye portion and including offset means actuated by said cam means for flexing said branches towards said inner plate to place said branches under tension, and keeper means on said branches for interlocking with said cam means while said branches are under tension.

7. A fastener for removably clamping together an inner plate having an opening and an outer plate comprising a bolt rotatably mounted on said outer plate and projectible into and through said opening and including cam means, locking spring means comprising a loop having its ends secured to said inner plate and including spaced arms disconnectably crossed in contiguous relation substantially intermediately thereof and having the major portions thereof normally spaced from said inner plate to define elastic branches for straddling said bolt and an elastic normally expanded eye portion, said branches including means actuated upon by said cam means upon rotation of said bolt to spread said branches and contract said eye portion and including offset means actuated by said cam means for flexing said branches towards said inner plate to place said branches under tension, and keeper means on said branches for interlocking with said cam means while said branches are under tension.

8. A fastener for removably clamping together an inner plate having an opening and an outer plate comprising a bolt rotatably mounted on said outer plate and projectible into and through said opening and including cam means, locking spring means comprising a loop having its ends secured to said inner plate and including spaced arms disconnectably crossed intermediately thereof and having the major portions thereof normally spaced from said inner plate to define elastic branches for straddling said bolt and an elastic normally expanded eye portion, said branches including means actuated upon by said cam means upon rotation of said bolt to spread said branches and contract said eye portion and including alternate offset means actuated by said cam means for flexing said branches towards said inner plate to place said branches under tension, and keeper means on said branches for interlocking with said cam means while said branches are under tension.

9. A fastener for removably clamping together an inner plate having an opening and an outer plate comprising a bolt rotatably mounted on said outer plate and projectible into and through said opening and including winged means, locking spring means comprising a resilient wire loop having its ends secured to said inner plate and including spaced arms disconnectably crossed in contiguous relation substantially intermediately thereof and having the major portions thereof normally spaced from said inner plate to define elastic branches for straddling said bolt and an elastic normally expanded eye portion, said branches including means actuated upon by said winged means upon rotation of said bolt to spread said branches and contract said eye portion and including offset means actuated by said winged means for flexing said branches towards said inner plate to place said branches under tension, and keeper means on said branches for interlocking with said cam means while said branches are under tension.

10. A fastener for removably clamping together an inner plate having a substantially butterfly shaped opening and an outer plate comprising a bolt rotatably mounted on said outer plate and including a shank having winged cam means projectible through said opening, locking spring means comprising a resilient wire loop having its ends secured to said inner plate and including spaced arms disconnectably crossed in contiguous relation substantially intermediately thereof and having the major portions thereof normally spaced from said inner plate to define elastic branches for straddling said bolt and an elastic normally expanded eye portion, said branches including means actuated upon by said cam means upon rotation of said bolt to spread said branches and contract said eye portion and including offset means actuated by said cam means for flexing said branches towards said inner plate to place said branches under tension, and keeper means on said branches for disengageably interlocking with said cam means while said branches are under tension.

11. A fastener for removably clamping together an inner plate and an outer plate comprising a bolt rotatably mounted on said outer plate, said inner plate having an opening including an expanded portion and restricted portions, said bolt including a shank projectible into said expanded portion and having winged means projectible through said restricted portions, means comprising a resilient wire loop having its ends secured to said inner plate and including spaced arms disconnectably crossed in contiguous relation substantially intermediately thereof and having the major portions thereof normally spaced from said inner plate to define elastic branches for straddling said bolt and an elastic normally expanded eye portion, said branches including means actuated upon by said winged means upon rotation of said bolt to spread said branches and contract said eye portion and including cam means actuated by said winged means for flexing said branches towards said inner plate to place said branches under tension, and keeper means on said branches for disconnectably interlocking with said winged means while said branches are under tension.

HYMAN R. SEGAL.